(12) United States Patent
Ohshima

(10) Patent No.: US 11,140,244 B2
(45) Date of Patent: Oct. 5, 2021

(54) COMMUNICATION APPARATUS CAPABLE OF PERFORMING COMMUNICATION USING CLIENT FUNCTION AND COMMUNICATION USING SERVER FUNCTION, METHOD OF CONTROLLING THE COMMUNICATION APPARATUS, AND STORAGE MEDIUM

(71) Applicant: CANON KABUSHIKI KAISHA, Tokyo (JP)

(72) Inventor: Hideaki Ohshima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/781,447

(22) Filed: Feb. 4, 2020

(65) Prior Publication Data

US 2020/0259932 A1  Aug. 13, 2020

(30) Foreign Application Priority Data

Feb. 7, 2019 (JP) .............................. JP2019-020848

(51) Int. Cl.
*H04L 29/06* (2006.01)
*H04L 29/08* (2006.01)

(52) U.S. Cl.
CPC .............. *H04L 67/42* (2013.01); *H04L 67/02* (2013.01); *H04L 67/06* (2013.01); *H04L 67/14* (2013.01)

(58) Field of Classification Search
CPC ......... H04L 67/42; H04L 67/02; H04L 67/06; H04L 67/14; H04L 69/18
See application file for complete search history.

(56) References Cited

U.S. PATENT DOCUMENTS

| | | | | |
|---|---|---|---|---|
| 9,906,581 B2* | 2/2018 | Okubo | .................... | H04L 69/14 |
| 2007/0285501 A1* | 12/2007 | Yim | ....................... | H04N 21/23 348/14.08 |
| 2013/0163051 A1* | 6/2013 | Taniguchi | ........ | H04N 21/43615 358/1.15 |
| 2014/0064260 A1* | 3/2014 | Mastenbrook | ........ | H04W 76/14 370/338 |

(Continued)

FOREIGN PATENT DOCUMENTS

JP       2005-026971 A    1/2005

*Primary Examiner* — Joe Chacko
(74) *Attorney, Agent, or Firm* — Cowan, Liebowitz & Latman, P.C.

(57) ABSTRACT

A communication apparatus comprises: one or more processors; and a memory storing instructions which, when the instructions are executed by the one or more processors, cause the communication apparatus to function as: a communication unit configured to communicate with an external device; and a control unit configured to control first communication in which the communication apparatus operates as a client and second communication in which the communication apparatus operates as a server, in communication using the communication unit, wherein, when executing a connection operation of each communication in order to control the first communication and the second communication in parallel, the control unit matches a termination timing of the connection operation of the first communication and a termination timing of the connection operation of the second communication.

9 Claims, 6 Drawing Sheets

(56) References Cited

U.S. PATENT DOCUMENTS

| | | | |
|---|---|---|---|
| 2016/0105644 A1* | 4/2016 | Smith | G08B 13/1966 |
| | | | 348/159 |
| 2017/0251440 A1* | 8/2017 | Gilson | H04W 4/80 |
| 2018/0027070 A1* | 1/2018 | Jhanji | H04W 4/08 |
| | | | 709/217 |

* cited by examiner

FIG. 2A

| CONNECTED DEVICE INFORMATION NUMBER | 1 | 2 | 3 | 4 | 5 | | N |
|---|---|---|---|---|---|---|---|
| DEVICE TYPE | CELLULAR PHONE | HTTP | PC | FTP | - | | - |
| CONNECTION MODE | SERVER MODE 2 | SERVER MODE 1 | SERVER MODE 2 | CLIENT MODE 1 | - | | - |
| REGISTERED NAME | mobilePhone1 | HTTP1 | PC1 | FTP1 | - | | - |
| UUID | 0000-ABCD-EFGH | - | 0011-AAAA-8888 | - | - | | - |
| VIEW PERMISSION | PERMIT | - | PERMIT | - | - | | - |
| FTP SERVER ADDRESS | - | - | - | 192.168.1.2 | - | | - |
| FTP LOGIN NAME | - | - | - | anonymous | - | | - |
| FTP PASSWORD | - | - | - | 0 | - | | - |
| FILE OVERWRITING | - | - | - | OVERWRITING | - | | - |
| NETWORK FORMATION PARAMETER NUMBER | 1 | - | - | - | - | | - |

FIG. 2B

| NETWORK PARTICIPATION PARAMETER NUMBER | 1 | 2 | 3 | 4 | 5 | M |
|---|---|---|---|---|---|---|
| CONNECTION CONFIGURATION | WIRELESS LAN | WIRED LAN | — | — | — | — |
| CONNECTION ORDER | 6 | 2 | — | — | — | — |
| ESSID | NETWORK-100 | — | — | — | — | — |
| AUTHENTICATION METHOD | WPA2 | — | — | — | — | — |
| ENCRYPTION TYPE | AES | — | — | — | — | — |
| ENCRYPTION KEY | abcdefgh | — | — | — | — | — |
| CHANNEL | 1 | — | — | — | — | — |
| IP ADDRESS ACQUISITION METHOD | Auto | Auto | — | — | — | — |
| DNS ACQUISITION METHOD | Auto | Auto | — | — | — | — |

FIG. 2C

| NETWORK FORMATION PARAMETER NUMBER | 1 | 2 | 3 | 4 | 5 | ... | N |
|---|---|---|---|---|---|---|---|
| ESSID | CAMERA-123 | - | - | - | - | | - |
| ENCRYPTION KEY | 12345678 | - | - | - | - | | - |

FIG. 2D

| CONNECTION SETTING RELATED INFORMATION | CONNECTED DEVICE INFORMATION | NETWORK PARTICIPATION PARAMETER | NETWORK FORMATION PARAMETER |
|---|---|---|---|
| SET 1 | 2,4 | 1 | - |
| SET 2 | 3,4 | 2 | - |
| SET 3 | 1 | - | 1 |
| SET J | - | - | - |

FIG. 3A

| 300 SINGLE PROTOCOL CONNECTION OPERATION | 301 CLIENT MODE 1 | 302 CLIENT MODE 2 | 303 SERVER MODE 1 | 304 SERVER MODE 2 |
|---|---|---|---|---|
| CONNECTION TIME-OUT PERIOD | 10sec | 30sec | 180sec | INDEFINITE |
| CLIENT RECONNECTION COUNT | REPEAT CONNECTION 6 TIMES | NO REPEAT CONNECTION 0 TIMES | NONE | NONE |

FIG. 3B

| 310 MULTIPLE PROTOCOL CONNECTION OPERATION | 311 CLIENT MODE 1 + SERVER MODE 1 | 312 CLIENT MODE 2 + SERVER MODE 1 | 313 CLIENT MODE 1 + SERVER MODE 2 | 314 CLIENT MODE 2 + SERVER MODE 2 |
|---|---|---|---|---|
| CONNECTION TIME-OUT PERIOD | CLIENT: 10sec SERVER: 180sec | CLIENT: 30sec SERVER: 180sec | CLIENT: 10sec SERVER: INDEFINITE | CLIENT: 30sec SERVER: INDEFINITE |
| CLIENT RECONNECTION COUNT | REPEAT CONNECTION 18 TIMES | NO REPEAT CONNECTION 0 TIMES | CLIENT: INDEFINITE | CLIENT: INDEFINITE |

FIG. 3C

| 320 MULTIPLE PROTOCOL CONNECTION OPERATION | 321 CLIENT MODE 1 + SERVER MODE 1 | 322 CLIENT MODE 2 + SERVER MODE 1 | 323 CLIENT MODE 1 + SERVER MODE 2 | 324 CLIENT MODE 2 + SERVER MODE 2 |
|---|---|---|---|---|
| CONNECTION TIME-OUT PERIOD | CLIENT: 10sec SERVER: 60sec | CLIENT: 30sec SERVER: 30sec | CLIENT: 10sec SERVER: 60sec | CLIENT: 30sec SERVER: 30sec |
| CLIENT RECONNECTION COUNT | REPEAT CONNECTION 6 TIMES | NO REPEAT CONNECTION 0 TIMES | REPEAT CONNECTION 6 TIMES | NO REPEAT CONNECTION 0 TIMES |

COMMUNICATION APPARATUS CAPABLE OF PERFORMING COMMUNICATION USING CLIENT FUNCTION AND COMMUNICATION USING SERVER FUNCTION, METHOD OF CONTROLLING THE COMMUNICATION APPARATUS, AND STORAGE MEDIUM

BACKGROUND OF THE INVENTION

Field of the Invention

The present invention relates to a communication apparatus that is capable of performing communication using a client function and communication using a server function, a method of controlling the communication apparatus, and a storage medium.

Description of the Related Art

In recent years, image capturing apparatuses, such as digital cameras, that have a wireless communication function are becoming popular. An image capturing apparatus having the wireless communication function can realize a function of transmitting image data captured by the image capturing apparatus to a designated external device, by running a client function. Alternatively, the image capturing apparatus can realize a function of performing image capturing or image viewing upon receiving a remote operation from an external device, such as a smartphone, by running a server function.

In contrast to such individual use cases using the server function or the client function, there are demands for realization of a new use case by combining a use case that uses the server function and a use case that uses the client function. For example, if a use case for performing image capturing or image viewing in response to a remote operation and a use case for transmitting captured or viewed image data to an external device are simultaneously realized, a highly convenient remote operation can be provided.

As a technique for performing communication using the server function and the client function, a technique (Japanese Patent Laid-Open No. 2005-26971) is known that selects, according to the configuration of communication with a partner apparatus, a communication method of communicating with the partner apparatus by using both the client function and the server function or a communication method of communicating with the partner apparatus by using one of the functions.

In order to run the client function and the server function in parallel, it is necessary to wait for communication from an external device by using the server function while trying for communication connection from the self apparatus to the external device by using the client function. As described above, connection methods differ between the server function and the client function, and accordingly, if a connection time-out, a reconnection count, etc. until starting each communication are not considered, connection errors may separately occur and it may be difficult to grasp the state of the apparatus. Furthermore, there is a risk that unintended processes will be generated as a result of only some processes being executed. In Japanese Patent Laid-Open No. 2005-26971, consideration is not given to control of connection operations in a case in which the client function and the server function are run in parallel.

SUMMARY OF THE INVENTION

The present disclosure has been made in consideration of the aforementioned issues, and realizes a technique that makes it possible to easily grasp a connection state when executing communication using the client function and communication using the server function in parallel.

In order to solve the aforementioned problems, one aspect of the present disclosure provides a communication apparatus comprising: one or more processors; and a memory storing instructions which, when the instructions are executed by the one or more processors, cause the communication apparatus to function as: a communication unit configured to communicate with an external device; and a control unit configured to control first communication in which the communication apparatus operates as a client and second communication in which the communication apparatus operates as a server, in communication using the communication unit, wherein, when executing a connection operation of each communication in order to control the first communication and the second communication in parallel, the control unit matches a termination timing of the connection operation of the first communication and a termination timing of the connection operation of the second communication.

Another aspect of the present disclosure provides, a method of controlling of a communication apparatus that includes a communication unit configured to communicate with an external device, the method comprising: controlling first communication in which the communication apparatus operates as a client and second communication in which the communication apparatus operates as a server, in communication using the communication unit, wherein, when executing a connection operation of each communication in order to control the first communication and the second communication in parallel, in the controlling the first communication and the second communication, a termination timing of the connection operation of the first communication and a termination timing of the connection operation of the second communication are matched.

Still another aspect of the present disclosure provides, a non-transitory computer-readable storage medium storing a program for causing a computer to execute a method of controlling of a communication apparatus that includes a communication configured to communicate with an external device, the method comprising: controlling first communication in which the communication apparatus operates as a client and second communication in which the communication apparatus operates as a server, in communication using the communication unit, wherein, when executing a connection operation of each communication in order to control the first communication and the second communication in parallel, in the controlling the first communication and the second communication, a termination timing of the connection operation of the first communication and a termination timing of the connection operation of the second communication are matched.

According to the present invention, a connection state can be easily grasped when executing communication using the client function and communication using the server function in parallel.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 2A to 2D are diagrams showing one example of connection information held by the digital camera according to the present embodiment.

FIGS. 3A to 3C are diagrams showing connection operations according to the present embodiment.

DESCRIPTION OF THE EMBODIMENTS

Figure 1:
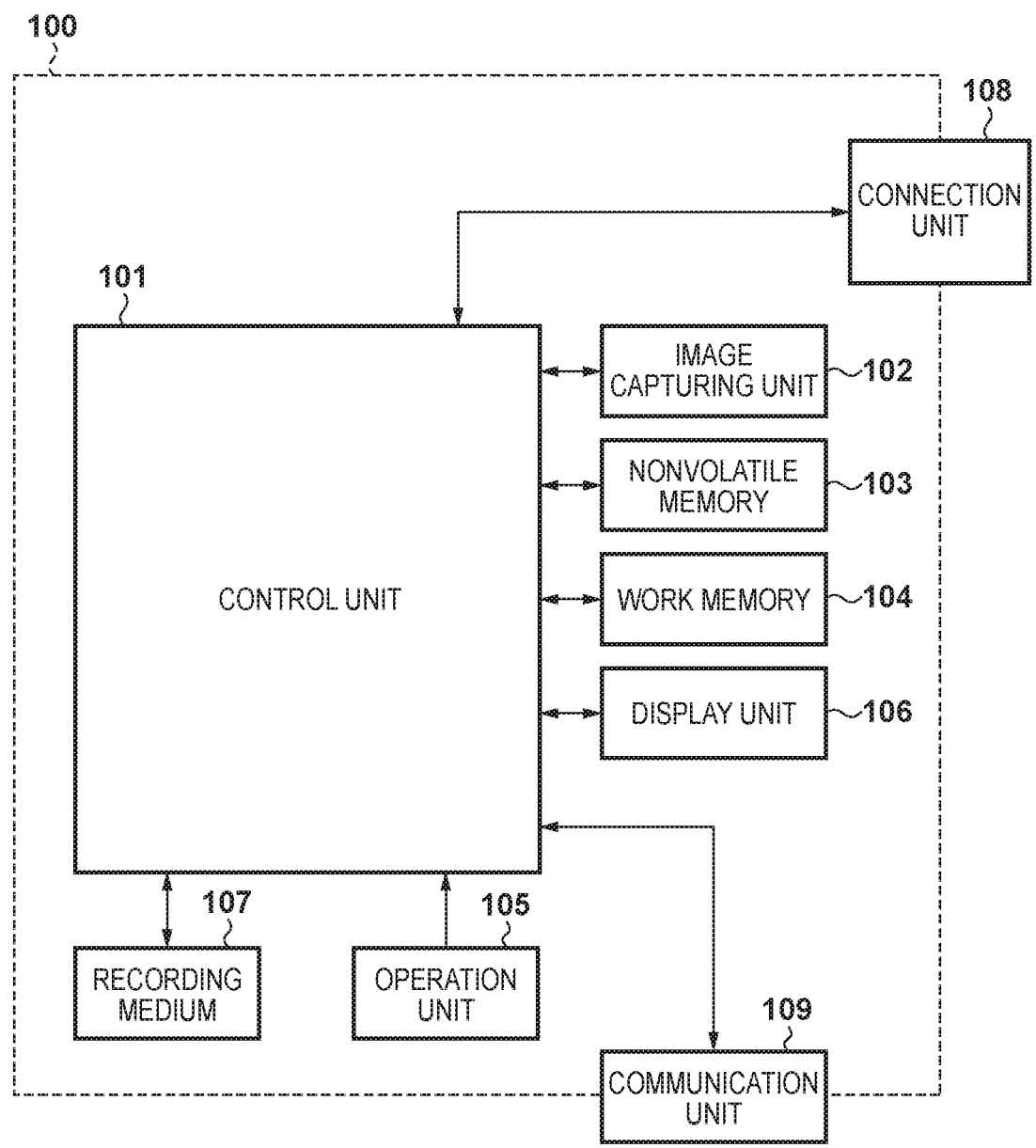
FIG. 1 is a block diagram showing an example of a functional configuration of a digital camera, which is one example of a communication apparatus according to the present embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

The following describes an example in which a digital camera that is capable of executing a server function and a client function in parallel is used as one example of a communication apparatus. However, the present embodiment can be applied to not only a digital camera, but also other devices that are capable of executing the server function and the client function in parallel. Examples of these devices may include personal computers, cellular phones including smartphones, game machines, tablet terminals, information terminals having the shape of a watch or a pair of glasses, medical devices, and devices in vehicle-mounted systems.

Configuration of Digital Camera 100

FIG. 1 is a block diagram showing an example of a functional configuration of a digital camera 100, which is one example of a communication apparatus according to the present embodiment. Note that one or more functional blocks shown in FIG. 1 may be realized by hardware, such as an ASIC or a Programmable Logic Array (PLA), or may be realized as a result of a programmable processor, such as a CPU or an MPU, executing software. Alternatively, one or more functional blocks may be realized by a combination of software and hardware. Also, processes may be shared by a plurality of functional blocks, rather than being executed by one functional block, or processes may be executed by one functional block, rather than being executed by a plurality of functional blocks.

A control unit 101 includes a computation circuit, such as a CPU or a GPU, and controls operations of the overall digital camera 100 by loading programs stored in a nonvolatile memory 103 into a work memory 104 and executing the programs. For example, in response to a signal that is input from an image capturing unit 102, a communication unit 109, or an operation unit 105, the control unit 101 can perform capturing processing, transmit or receive data, or display a user interface according to an operation.

The image capturing unit 102 includes an image sensor that converts an optical image of an object formed by a lens included in the image capturing unit 102 into an electrical signal, performs noise reduction processing or the like on the signal output from the image sensor, and outputs digital data as image data. After the captured image data is stored in a buffer memory, a predetermined computation is performed on the image data by the control unit 101, and the image data is then recorded in a recording medium 107.

The nonvolatile memory 103 is an electrically erasable/recordable nonvolatile memory, and programs (to be described later) to be executed by the control unit 101 and the like are stored in the nonvolatile memory 103. The work memory 104 is a volatile memory that is constituted by a semiconductor memory, for example. The work memory 104 is used as a buffer memory that temporarily holds image data captured by the image capturing unit 102, an image display memory for a display unit 106, or a work area for the control unit 101, for example.

The operation unit 105 is an operation member that is used for receiving operation instructions given from a user to the digital camera 100. The operation unit 105 includes, for example, a power button that is used by the user to turn on or off the power of the digital camera 100, a release switch for giving a capturing instruction, and a reproduction button for giving an instruction for reproducing image data. The operation unit 105 also includes a touch panel that is formed in the display unit 106. Note that the release switch includes SW1 and SW2. SW1 is turned on when the release switch is half-pressed. Thus, the operation unit 105 receives an instruction for performing capturing preparation, such as AF (Auto Focus) processing, AE (Auto Exposure) processing, AWB (Auto White Balance) processing, or EF (Electronic Flash) processing. Also, SW2 is turned on when the release switch is full-pressed. Thus, the operation unit 105 receives an instruction for performing capturing.

The display unit 106 is a display apparatus that is constituted by a liquid crystal panel or an organic EL panel, for example, and displays a viewfinder image at the time of capturing, captured image data, characters for a screen for an interactive operation, etc. Note that the display unit 106 does not necessarily have to be built into the digital camera 100. It is only required that the digital camera 100 can be connected to an internal or external display unit 106 and at least has a display control function for controlling display by the display unit 106.

The recording medium 107 is constituted by a semiconductor memory, a hard disk, or the like and, for example, image data output from the image capturing unit 102 is recorded in the recording medium 107. The recording medium 107 may be configured to be attached to and detached from the digital camera 100, or may be built into the digital camera 100. That is, the digital camera 100 is only required to at least have a function for accessing the recording medium 107.

A connection unit 108 is an interface for connecting to an external wireless LAN device (also simply referred to as an external WFT). The digital camera 100 according to the present embodiment is capable of exchanging data with an external device through the connection unit 108. Note that, in the present embodiment, the connection unit 108 includes an interface for communicating with an external device using a wireless LAN. The control unit 101 realizes wireless communication with an external device by controlling the connection unit 108. Note that the communication method is not limited to the wireless LAN.

The communication unit 109 is built into the main body of the digital camera 100. The control unit 101 realizes communication with an external device by controlling the communication unit 109. Examples of the communication method include the wireless LAN and a wired LAN, but there is no limitation thereto.

Note that the digital camera 100 in the present embodiment is capable of operating as a slave device in the infrastructure mode of the wireless LAN. If the digital camera 100 operates as a slave device, the digital camera 100 can join in a network formed by an access point (also simply referred to as an AP) in a surrounding area by connecting to the AP. The digital camera 100 in the present embodiment is also capable of operating as a simple AP, which is a kind of AP but has a limited function. Note that an AP in the present embodiment operates as one example of a relay device. When the digital camera 100 operates as a simple AP, the digital camera 100 forms a network by itself. Apparatuses that are located in the surrounding area of the digital camera 100 can recognize the digital camera 100 as an AP and join in the network formed by the digital camera 100. Note that these operations using a communication function of the communication unit 109 are realized as a result of the control unit 101 executing programs stored in the nonvolatile memory 103.

Note that, although the digital camera 100 in the present embodiment operates as a kind of AP, this is a simple AP that does not have a gateway function for transferring data received from a slave device to an Internet provider or the like. Therefore, even if the digital camera 100 has received data from another apparatus that is joining in the network formed by the digital camera 100, the digital camera 100 cannot transfer the data to a network, such as the Internet. Note that another embodiment is also possible in which the digital camera 100 is provided with the gateway function.

Example of Connection Information Stored in History Information

Next, an example of connection information that is stored in history information regarding the digital camera 100 according to the present embodiment will be described with reference to FIGS. 2A to 2D. When connecting to an external device, the digital camera 100 first joins in a network (this includes a case in which the digital camera forms the network as a simple AP), and thereafter establishes a connection to the external device. At this time, the digital camera 100 records connection information (information regarding the network and information regarding the external device to which the digital camera is connected) as history information, and manages the history information. For example, connected device information 200, network participation parameters 210, network formation parameters 220, and connection setting related information 230 are recorded in the history information.

The connected device information 200 shows one example of information for managing external devices to which the digital camera 100 has ever been connected via networks. The connected device information 200 includes "connected device information number", "device type", "registered name", "UUID", "view permission setting", and "network formation parameter number", which are given to each connected device. Also, the connected device information 200 includes "FTP server address", "FTP login name", "FTP password", and "file overwriting" as information that the digital camera 100 uses to perform, as a client, communication with a predetermined server (an FTP server in the example shown in FIG. 2A). Note that not only information regarding FTP servers, but also information regarding other servers, such as Web servers, may be included.

The "registered name" shown in FIG. 2A is the name of a connected device that can be set by the user, and can be freely changed so that the user can identify the connected device. The "device type", "registered name", and "UUID" do not necessarily have to be separate information pieces, and a configuration is also possible in which these pieces of information can be specified from a single ID generated by combining character strings from which the device type and the registered name can be uniquely identified, for example.

The "FTP server address" is the address of an FTP server to which the digital camera 100 is connected in a case in which the digital camera 100 has an FTP client mode. Similarly, the "FTP login name" and the "FTP password" are the login name and the password for logging in to the FTP server when performing FTP transfer. The "file overwriting" indicates whether or not overwriting is to be performed in a case in which, when performing FTP transfer of image data captured by the digital camera 100 to the FTP server, there is a file name that is the same as the file name of the image data, on the FTP server side. If overwriting is not to be performed, "_1" or the like is added to the file name of the image data to be transferred. The "network formation parameter number" indicates which parameter was used to form a network, out of the network formation parameters 220.

For example, information regarding N devices can be stored as the connected device information 200 and, in order to store further information it is necessary to delete already stored connected device information 200. A configuration is possible in which the digital camera 100 deletes the connected device information 200 in response to a user operation. Alternatively, a configuration is also possible in which, when storing new information in a state in which N pieces of information are stored, the digital camera 100 refers to "connection order" and deletes connected device information 200 that has the smallest number.

The network participation parameters 210 are information for managing networks that were formed by external APs or the like and in which the digital camera 100 joined in the past. The network participation parameters 210 include, for example, "network participation parameter number", "connection configuration", "connection order", "ESSID", "authentication method", "encryption type", "encryption key", and "channel" regarding connection to wireless networks. Also, the network participation parameters 210 include "IP address acquisition method" and "DNS acquisition method".

The "connection order" is the order in which the digital camera 100 joined in wireless networks stored in the network participation parameters 210, and the larger the number is, the more recently the digital camera 100 joined in the corresponding network. In the example of network participation parameters 210 shown in FIG. 2B, information regarding M networks can be stored and, in order to store further information, it is necessary to delete an already stored network participation parameter 210. Therefore, the digital camera 100 may delete a network participation parameter 210 in response to a user operation. Alternatively, a configuration is also possible in which, when storing new information in a state in which information regarding M networks is stored, the digital camera 100 refers to "connection order" and deletes a network participation parameter 210 that has the smallest number. Note that, if a network is formed by the self apparatus operating as a simple AP, information regarding the network is managed using a network formation parameter 220 described below, as information that can be distinguished from the network participation parameters 210.

The network formation parameters 220 are used for managing information regarding networks formed by the digital camera 100 operating as a simple AP. "Network formation parameter number", "ESSID", and "encryption key", which are given to each network formation parameter, are stored in the network formation parameters 220. Although a configuration is also possible in which an authentication method, an encryption type, a channel, an IP address acquisition method, a DNS acquisition method, etc. are stored in the network formation parameters 220, it is not always necessary to store items that are common between all networks generated by the digital camera 100. The number of networks for which information can be stored in the network formation parameters 220 is N, which is the same as the number of pieces of connected device information 200. If a piece of connected device information 200 is deleted, a network formation parameter 220 that is associated with the deleted connected device information 200 is deleted, and accordingly there is no situation in which more than N network formation parameters 220 are stored.

The connection setting related information 230 is a management table of combinations that each associate the connected device information 200 with a network participation parameter 210 or a network formation parameter 220. "SET 1" shown in the row 231 of the connection setting related information associates the columns 202 and 204 of the connected device information 200 where the connected device information number is "2" and "4" with the column 211 of the network participation parameter 210 where the network participation parameter number is "1". This means that HTTP connection processing shown in the column 202, in which the digital camera 100 operates as a server, and FTP connection processing shown in the column 204, in which the digital camera 100 operates as a client, are simultaneously started. At this time, a communication channel is established using the column 211 of the network participation parameter 210, as a communication channel to be used when the digital camera 100 performs communication. Note that the digital camera 100 is capable of storing up to J pieces of information that constitute the connection setting related information 230, for example. Examples in which the rows 232 and 233 are used will be described later. Note that the server shown in FIG. 2A is one example, and the digital camera 100 may operate not only as a server that uses the HTTP protocol, but also as a server that uses other communication protocols, such as the PTP protocol.

Note that the above-described history information can be loaded by the control unit 101 from the nonvolatile memory 103 into the work memory 104 and used by the control unit 101. In the following description, it is assumed that the history information is loaded into the work memory 104 and can be used by the control unit 101.

Example of Connection Operations in Digital Camera

Next, an example of connection operations performed in the digital camera 100 will be described with reference to FIGS. 3A to 3C. The digital camera 100 according to the present embodiment is capable of controlling a connection operation for performing communication using a single communication protocol and connection operations for performing communication using a plurality of communication protocols in parallel. In particular, when the digital camera 100 realizes simultaneous operations of a plurality of functions by controlling communication in which the digital camera 100 operates as a client and communication in which the digital camera 100 operates as a server in parallel, the digital camera 100 matches the timings at which connection operations of the respective types of communication terminate. That is, a situation is prevented in which a connection error occurs earlier in one type of communication than in the other type of communication to enable the user to easily recognize connection errors. For example, it is possible to notify the user of connection errors of a plurality of connection operations, with a single notification. Furthermore, when simultaneous operations of a plurality of types of communication are realized in parallel, if connection operations of the respective types of communication are terminated separately, there is a risk that only processes using one type of communication will be executed and unintended processes will be generated. However, such a risk can be reduced. The control unit 101 is capable of specifying which connection operation parameters are to be used in a certain protocol (or combination of protocols) by referring to a single protocol connection operation 300 or a multiple protocol connection operation 310 or 320. The control unit 101 is capable of determining termination timings of connection operations of respective types of communication, based on connection operation parameters, such as the period for performing connection trial or the period for performing connection standby in the connection operations. Note that, in the description of the present embodiment regarding control that is performed to match termination timings of connection operations of respective types of communication, the meaning of "match" is not limited to a case in which the connection operations are terminated absolutely at the same point in time but also includes a case in which there is a certain time gap between time points at which the connection operations are respectively terminated. That is, the termination timings can be set providing a predetermined period therebetween by considering the frequency of connection errors or the like such that the effects of the present invention can be achieved.

The single protocol connection operation 300 shows connection operations that are each performed when the digital camera 100 runs a single predetermined protocol. For example, in a single protocol connection operation 301 of a client mode 1, the connection time-out period is set to 10 seconds. This means that, when establishing a connection as a client, a single connection time-out is set to 10 seconds. Also, the trial count of connection by the client (also simply referred to as a client reconnection count) is set to six times. This means that, if establishment of a connection is not completed in 10 seconds, the same connection processing is tried a total of six times. That is, in a situation in which a connection cannot be established due to some causes, in the single protocol connection operation 301 of the client mode 1, an error occurs upon 10×6=60 seconds having elapsed, and the connection operation is terminated. That is, the period for performing connection trial in this communication is 60 seconds.

In a single protocol connection operation 302 of a client mode 2, the connection time-out period is set to 30 seconds. This means that, when establishing a connection as a client, a single connection time-out is set to 30 seconds. Also, the client reconnection count is set to zero. That is, in a situation in which a connection cannot be established due to some causes, in the single protocol connection operation 302 of the client mode 2, reconnection processing is not performed, and accordingly, upon 30 seconds having elapsed, an error occurs and the connection operation is terminated. That is, the period for performing connection trial in this communication is 30 seconds.

On the other hand, in a single protocol connection operation 303 of a server mode 1, the connection time-out period is set to 180 seconds. This means that, when waiting for, as a server, establishment of a connection by a client, a single connection time-out is set to 180 seconds. No reconnection count is set for the server. That is, in the single protocol connection operation 303 of the server mode 1, if a connection is not established by a client, an error occurs upon 180 seconds having elapsed, and the connection operation is terminated. That is, the period for performing connection standby in this communication is 180 seconds.

In a single protocol connection operation 304 of a server mode 2, the connection time-out period is indefinite. This means that, when waiting for, as a server, establishment of a connection by a client, a single connection time-out is indefinite. No reconnection count is set for the server. That is, in the single protocol connection operation 304 of the server mode 2, if a connection is not established by a client, a time-out does not occur (the connection operation is not terminated). In this case, the control unit 101 may set the period for performing connection standby in this communication to the maximum value that can be set.

Next, the multiple protocol connection operation 310 will be described. The multiple protocol connection operation 310 shows connection operations that are performed when the digital camera 100 simultaneously runs protocols in parallel, with a combination of communication of a client mode and communication of a server mode.

In a connection operation 311 with a combination of the client mode 1 and the server mode 1, the connection time-out period of the client mode 1 is set to 10 seconds, and the connection time-out period of the server mode 1 is set to 180 seconds. This means that, when establishing a connection as a client, a single connection time-out is set to 10 seconds. Also, this means that, when waiting for, as a server, establishment of a connection by a client, a single connection time-out is set to 180 seconds (i.e., the period for performing connection standby is set to 180 seconds). Also, the client reconnection count is set to 18 times. This means that, if establishment of a connection is not completed in 10 seconds, the same connection processing is tried a total of 18 times (i.e., the period for performing connection trial is set to 180 seconds). That is, the termination timing of the connection operation of communication in which the digital camera 100 is connected as a server and the termination timing of the connection operation of communication in which the digital camera 100 is connected as a client are matched.

The client reconnection count of the client mode 1 is six times in the above-described single protocol connection operation 301, and the connection time-out period of the server mode 1 is 180 seconds, and accordingly the termination timings of the respective connection operations do not match each other Therefore, in the multiple protocol connection operation, the control unit 101 sets the time-out timing of each connection operation to the time-out timing of a connection operation that has a longer period of time before termination. That is, in the example shown in the column 311, the client reconnection count of the client mode 1 is changed (from six times) to 18 times. That is, if a connection cannot be established due to some causes, in the protocol connection operation 311, connection trial is performed for 10×18=180 seconds, and upon this period having elapsed, an error occurs and the connection operation is terminated. On the other hand, if a connection is not established by a client, in the protocol connection operation 311, connection standby is performed for 180 seconds, and upon this period having elapsed, an error occurs and the connection operation is terminated.

Note that, in a connection operation 312 with a combination of the client mode 2 and the server mode 1 and a connection operation 313 with a combination of the client mode 1 and the server mode 2 as well, each period is adjusted such that termination timings of connection operations of respective types of communication match each other. The same also applies to a connection operation 314 with a combination of the client mode 2 and the server mode 2.

Next, the multiple protocol connection operation 320 will be described. In the multiple protocol connection operation 320, timings are controlled in substantially the same manner as that in the multiple protocol connection operation 310. The difference from the multiple protocol connection operation 310 is that the time-out is set to the time-out of a connection operation that has a shorter period of time, rather than a longer period of time, before termination.

In a connection operation 321 with a combination of the client mode 1 and the server mode 1, the connection time-out period of the client mode 1 is set to 10 seconds, and the connection time-out period of the server mode 1 is set to 60 seconds. This means that, when establishing a connection as a client, a single connection time-out is set to 10 seconds and, when waiting for, as a server, establishment of a connection by a client, a single connection time-out is set to 60 seconds. Also, the client reconnection count is set to six times. This means that, if establishment of a connection is not completed in 10 seconds, the same connection processing is tried a total of six times. The connection time-out period is 180 seconds in the single protocol connection operation 303 of the server mode 1, whereas a total connection time-out period is set to 60 seconds in the multiple protocol connection operation 321 of the server mode 1. That is, the period for performing connection standby is changed to 60 seconds so as to match the shorter period. That is, if a connection cannot be established due to some causes, in the client mode 1 of the protocol connection operation 321, the connection operation is terminated (an error occurs) upon 10×6=60 seconds having elapsed. On the other hand, if a connection is not established by a client, the protocol connection operation of the server mode 1 is terminated (an error occurs) upon 60 seconds having elapsed.

In connection operations with other combinations, such as a connection operation 322 with a combination of the client mode 2 and the server mode 1, as well, the control unit 101 performs control such that termination timings of connection operations of respective types of communication match each other.

Note that the above-described examples shown in FIGS. 3A to 3C are examples in which the connection operation of a server and the connection operation of a client are started at the same time, and the period for performing connection standby in the server mode and the period for performing connection trial in the client mode are matched. However, the connection operation of a server and the connection operation of a client need not be started at the same time. For example, in the example shown in the column 311, if the connection operation of the client is started earlier, timings of the connection operations of respective types of communication may be matched by correcting (in this case, reducing) the connection standby period of the server according to a difference between the activation time of the server and the activation time of the client.

Series of Operations Regarding Communication Connection Processing

Figure 4:
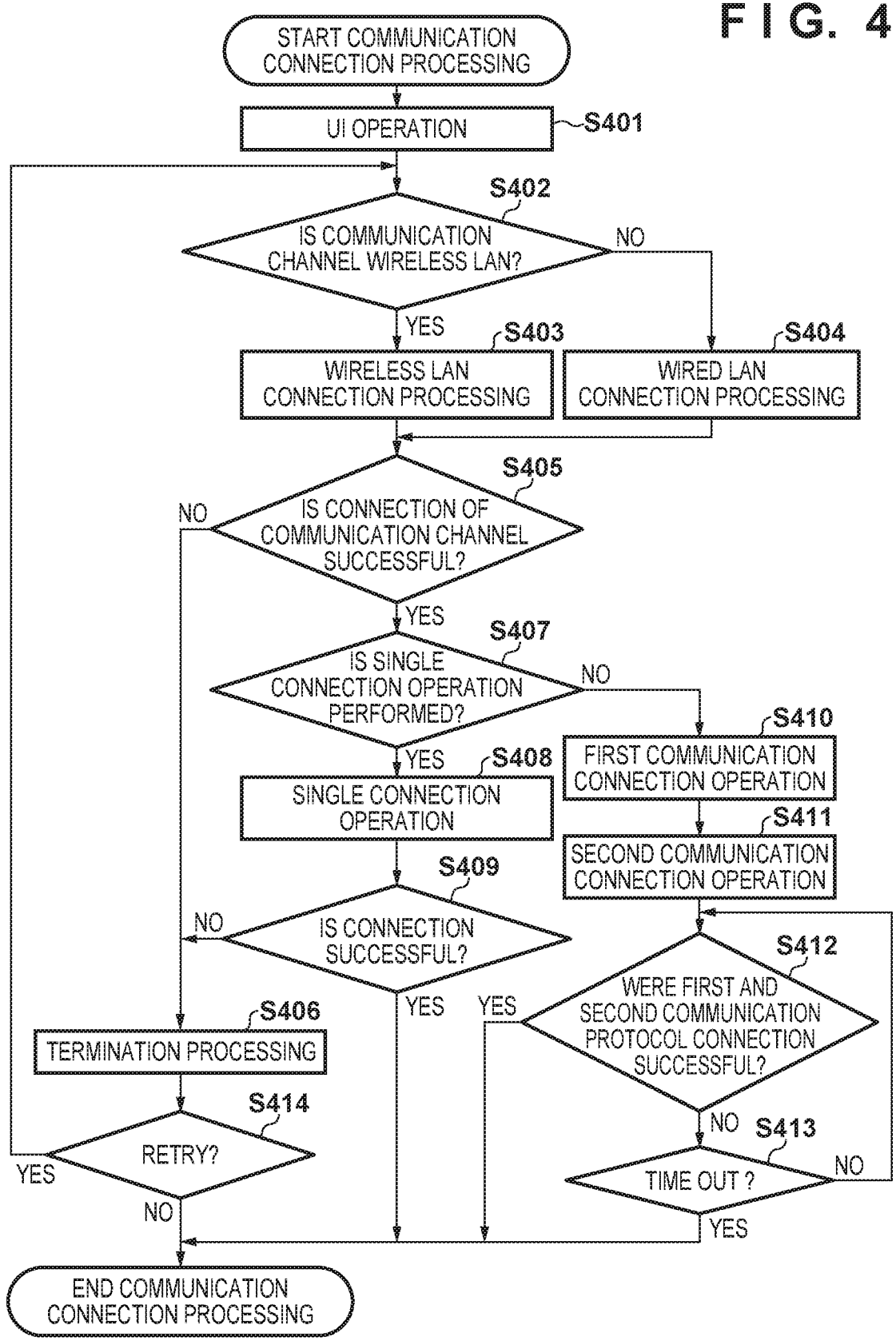
FIG. 4 is a flow chart showing a series of operations performed in communication connection processing according to the present embodiment.

Next, a series of operations that are executed by the digital camera 100 regarding communication connection processing will be described with reference to FIG. 4. Note that this processing is realized as a result of the control unit 101 loading a program stored in the nonvolatile memory 103 into the work memory 104, and executing the program. Also, this processing is started in response to the user of the digital camera 100 performing a menu operation or the like to give an instruction for establishing a connection to another apparatus. Assume that, in the following example, four pieces of connected device information shown in the columns 201 to 204 are registered as the connected device information 200 in the history information shown in FIG. 2A. Likewise, the columns 211 and 212 are each registered as the network participation parameter 210, and the column 221 is registered as the network formation parameter 220. Further, these pieces of information are associated as shown in the rows 231 to 233 in the connection setting related information 230.

In step S401, the control unit 101 receives a UI operation performed by the user through the operation unit 105. For example, the control unit 101 displays, in the display unit 106, menu information that includes information regarding at least one row of the connection setting related information, and receives a combination of communication for which connection operations are to be performed, according to selection by the user. Upon receiving, for example, selection of "SET 1" of the connection setting related information through the operation unit 105, the control unit 101 receives selection by the user that indicates performing HTTP communication as a server and performing FTP communication as a client.

In step S402, the control unit 101 determines whether the communication channel is a wireless LAN. For example, the control unit 101 refers to a setting value of the "connection configuration" in the network participation parameter information 210, based on the connection setting related information selected in step S401, and determines whether the connection is to be established using a wireless LAN or a wired LAN. If the connection configuration is the wireless LAN, the control unit 101 advances the processing to step S403, and if the connection configuration is the wired LAN, the control unit 101 advances the processing to step S404. In this description, the network participation parameter number shown in the row 231 of the connection setting related information 230 is "1", Therefore, the control unit 101 refers to information in the column 211 of the network participation parameter 210 where the network participation parameter number is "1". In the example shown in FIG. 2B, the connection configuration shown in the column 211 is "wireless LAN", and therefore the control unit 101 advances the processing to step S403 so that the connection will be established using a wireless LAN.

In step S403, the control unit 101 refers to the network participation parameter information 210 and performs wireless LAN connection processing through the connection unit 108 or the communication unit 109 using each parameter described in the column 211. Upon executing the connection processing, the control unit 101 advances the processing to step S405. In contrast, in step S404, the control unit 101 refers to the network participation parameter information 210 and performs wired LAN connection processing through the communication unit 109. Upon executing the connection processing, the control unit 101 advances the processing to step S405. Note that, in the example of "SET 1" shown in the row 231, the wireless LAN is used, and accordingly this step is not executed.

In step S405, the control unit 101 determines whether the connection of the communication channel for which the connection processing has been performed in step S403 or S404 was successful. Upon determining that the connection was successful, based on a signal from a partner (for example, AP) of the connection processing or the authentication result, the control unit 101 advances the processing to step S407, and upon determining that the connection was not successful, the control unit 101 advances the processing to step S406. In step S406, the control unit 101 executes termination processing regarding the connection unit 108 or the communication unit 109, and upon executing the termination processing, advances the processing to step S414.

In step S407, the control unit 101 determines whether a single protocol connection operation is to be performed or a multiple protocol connection operation is to be performed. For example, the control unit 101 refers to the connected device information in information regarding "SET 1" of the connection setting related information 230 selected in step S401, and performs the determination based on whether the connected device information shows a single connected device information number or a plurality of connected device information numbers. Upon determining that a single protocol connection operation is to be performed, the control unit 101 advances the processing to step S408, and otherwise (i.e., a multiple protocol connection operation is to be performed) advances the processing to step S410. In the example in which "SET 1" of the connection setting related information 230 is selected, "2" and "4" are set as the connected device information numbers, and accordingly the control unit 101 determines that a multiple protocol connection operation is to be performed, and advances the processing to step S410.

In step S408, the control unit 101 activates a single protocol and starts a single protocol connection operation. For example, the control unit 101 refers to the connected device information 200 according to the connected device information number used for the determination in step S407. Then, the control unit 101 determines the communication protocol based on the "device type" in the connected device information 200. Thereafter, the control unit 101 sets the termination timing of the connection operation according to the connection mode, and starts the connection operation. After starting the connection operation, the control unit 101 advances the processing to step S409. Note that, in the example in which "SET 1" (i.e., the row 231) of the connection setting related information is selected, it is prescribed that communication using the HTTP protocol, which is associated with the connected device information number "2", and communication using the FTP protocol, which is associated with the connected device information number "4", are to be controlled in parallel. Therefore, this step is not executed. On the other hand, if "SET 3" (i.e., the row 233) of the connection setting related information 230 has been selected in step S401, a connection operation is performed using a communication protocol that is used in a cellular phone mode that is associated with the connected device information number "1". In this case, only the server mode 2 is operated, and accordingly the period for performing connection standby is set to indefinite based on the column 304 of the single protocol connection operation 300.

In step S409, the control unit 101 determines whether the connection operation performed using the communication protocol activated in step S408 through the connection unit 108 or the communication unit 109 was successful. Upon determining that the connection was successful, the control unit 101 ends the processing, and upon determining that the connection was not successful, the control unit 101 advances the processing to step S406.

In step S410, the control unit 101 starts a connection operation of communication using a first communication protocol. For example, the control unit 101 refers to the connected device information 200 according to the connected device information number in the connection setting related information 230 used for the determination in step S407. The control unit 101 determines the communication protocol based on the "device type" in the column 202 of the connected device information 200. Thereafter, the control unit 101 sets the termination timing of the connection operation, using the period for performing connection standby according to the connection mode, and starts the connection operation. Upon executing connection operation processing, the control unit 101 advances the processing to step S411. Note that, in the example in which "SET 1" (i.e., the row 231) of the connection setting related information 230 is selected, the control unit 101 performs, as a server, communication using the HTTP protocol, which is associated with the connected device information number "2". Also, the control unit 101 performs, as a client, communication using the FTP protocol, which is associated with the connected device information number "4", in parallel. In this example, the connection mode of the communication using the FTP protocol is the client mode 1, and the connection mode that is activated in parallel is the server mode 1. Therefore, the control unit 101 refers to the column 311 of the multiple protocol connection operation 310 shown in FIG. 3B or the column 321 of the multiple protocol connection operation 320, and sets the connection time-out period to 10 seconds. The reconnection count is set to 18 times if the connection operation is to be performed in accordance with the column 311, or is set to six times if the connection operation is to be performed in accordance with the column 321.

In step S411, the control unit 101 starts a connection operation of communication using a second communication protocol. For example, the control unit 101 refers to the connected device information 200 according to the connected device information number used for the determination in step S407. The control unit 101 determines the communication protocol based on the "device type" in the column 204 of the connected device information 200. Thereafter, the control unit 101 sets the termination timing of the connection operation, using the period for performing connection standby according to the connection mode, and starts the connection operation. In the example in which "SET 1" (i.e., the row 231) of the connection setting related information 230 is selected, the control unit 101 sets the period for performing connection standby as a server to 180 seconds referring to the connection operation 311, or sets the period to 60 seconds referring to the connection operation 321. Note that a configuration is also possible in which the control unit 101 determines which of the multiple protocol connection operation 310 and the multiple protocol connection operation 320 is to be referred to (i.e., to which period the connection operation is to be set), according to selection by the user.

In step S412, the control unit 101 determines whether both of the communication protocols with which the connection operations were started in steps S410 and S411 were successful. Upon determining that both of the protocols were successful, the control unit 101 ends the processing. If at least one of the protocols was not successful, the control unit 101 advances the processing to step S413.

In step S413, the control unit 101 determines whether a time-out has occurred in the connection operations started in steps S410 and S411. That is, the control unit 101 determines whether the termination timings of the connection operations set in steps S410 and S411 have passed, and upon determining that the timings have passed, the control unit 101 determines that the time-out has occurred, and ends the processing. In contrast, upon determining that the termination timings of the connection operations have not passed, the control unit 101 determines that the time-out has not occurred, and advances the processing to step S412 to continue the connection operations. Note that a configuration is also possible in which, upon determining that the time-out has occurred, the control unit 101 causes the display unit 106 to display a message that indicates that the connection operations of the selected communication failed. At this time, the control unit 101 can notify the user of the failure of the plurality of connection operations, with a single notification.

In step S414, the control unit 101 determines whether retry processing is necessary. Upon determining that retry processing is necessary, the control unit 101 returns the processing to step S402, and otherwise ends the processing. At this time, content of an error may be displayed in the display unit 106 or the error may be indicated by flashing an LED.

As described above, in the present embodiment, if the digital camera 100 executes connection operations of respective types of communication in order to control communication in which the digital camera 100 operates as a client and communication in which the digital camera 100 operates as a server in parallel, the digital camera 100 matches the termination timings of the connection operations of the respective types of communication. This prevents a situation in which a connection error occurs earlier in one type of communication than in the other type of communication, and enables the user to easily recognize connection errors. That is, it is possible to notify the user of connection errors of the plurality of connection operations, with a single notification. Furthermore, it is possible to suppress a situation in which the connection operations of the respective types of communication are terminated separately and reduce a risk that only processes using one type of communication will be executed and unintended processes will be generated. In other words, in a case in which communication using the client function and communication using the server function are executed in parallel, a connection state can be easily grasped. If the period for performing connection trial or the period for performing connection standby is set so as to match the longer one of the periods in the above-described embodiment, it is possible to provide time to spare in a connection operation by an external device, regarding, in particular, communication in which the digital camera performs connection standby as a server. On the other hand, if the period for performing connection trial or the period for performing connection standby is set so as to match the shorter one of the periods, it is possible to immediately recognize a connection error and notify the user of the connection error.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-020848, filed on Feb. 7, 2019, which is hereby incorporated by reference herein in its entirety.

What is claimed is:

1. A communication apparatus comprising:
one or more processors; and
a communication interface;
wherein the one or more processors execute computer instructions stored in memory that cause the following:
communicating with an external device via the communication interface; and
controlling first communication in which the communication apparatus operates as a client and second communication in which the communication apparatus operates as a server, in communication using the communication interface,
wherein, when executing a connection operation of each communication in order to control the first communication and the second communication in parallel, the one or more processors matches a termination timing of the connection operation of the first communication and a termination timing of the connection operation of the second communication,
wherein
the termination timing of the connection operation of the first communication is based on a period for performing connection trial in the connection operation of the first communication, and
the termination timing of the connection operation of the second communication is based on a period for performing connection standby in the connection operation of the second communication.

2. The communication apparatus according to claim 1, wherein
the one or more processors sets a period for performing the connection trial in a case in which the first communication and the second communication are controlled in parallel so as to differ from a period for performing the connection trial in a case in which the first communication and the second communication are not controlled in parallel.

3. The communication apparatus according to claim 2, wherein
the one or more processors sets a period for performing the connection standby in a case in which the first communication and the second communication are controlled in parallel so as to differ from a period for performing the connection standby in a case in which the first communication and the second communication are not controlled in parallel.

4. The communication apparatus according to claim 1, wherein
the one or more processors control unit controls the termination timing of the connection operation of the first communication by changing at least one of a time-out period that indicates when a time-out occurs in a single connection trial and a trial count that indicates the number of times of connection trials to be performed.

5. The communication apparatus according to claim 1, wherein
the first communication is communication using an FTP protocol in which the communication apparatus operates as a client.

6. The communication apparatus according to claim 1, wherein
the second communication is communication using an HTTP protocol in which the communication apparatus operates as a server.

7. The communication apparatus according to claim 1, wherein the one or more processors receives user selection regarding a combination of communication in which the communication apparatus operates as a client and communication in which the communication apparatus operates as a server.

8. A method of controlling of a communication apparatus that includes a communication interface for communicating with an external device, the method comprising:
controlling first communication in which the communication apparatus operates as a client and second communication in which the communication apparatus operates as a server, in communication using the communication interface,
wherein, when executing a connection operation of each communication in order to control the first communication and the second communication in parallel, in the controlling the first communication and the second communication, a termination timing of the connection operation of the first communication and a termination timing of the connection operation of the second communication are matched,
wherein
the termination timing of the connection operation of the first communication is based on a period for performing connection trial in the connection operation of the first communication, and
the termination timing of the connection operation of the second communication is based on a period for performing connection standby in the connection operation of the second communication.

9. A non-transitory computer-readable storage medium storing a program for causing a computer to execute a method of controlling of a communication apparatus that includes a communication interface for communicating with an external device, the method comprising:
   controlling first communication in which the communication apparatus operates as a client and second communication in which the communication apparatus operates as a server, in communication using the communication interface,
   wherein, when executing a connection operation of each communication in order to control the first communication and the second communication in parallel, in the controlling the first communication and the second communication, a termination timing of the connection operation of the first communication and a termination timing of the connection operation of the second communication are matched,
   wherein
the termination timing of the connection operation of the first communication is based on a period for performing connection trial in the connection operation of the first communication, and
the termination timing of the connection operation of the second communication is based on a period for performing connection standby in the connection operation of the second communication.

\* \* \* \* \*